Dec. 3, 1957 C. L. ESTES 2,815,486

ELECTRICAL SIGNAL TRANSLATING SYSTEM

Filed May 22, 1952 6 Sheets-Sheet 1

INVENTOR
CHARLES L. ESTES

BY Percy P. Lantzy

ATTORNEY

Dec. 3, 1957 C. L. ESTES 2,815,486

ELECTRICAL SIGNAL TRANSLATING SYSTEM

Filed May 22, 1952 6 Sheets-Sheet 2

INVENTOR
CHARLES L. ESTES
BY Percy P. Lantzy
ATTORNEY

INVENTOR
CHARLES L. ESTES
BY Percy P. Lantzy
ATTORNEY

Dec. 3, 1957 C. L. ESTES 2,815,486

ELECTRICAL SIGNAL TRANSLATING SYSTEM

Filed May 22, 1952 6 Sheets-Sheet 4

INVENTOR
CHARLES L. ESTES
BY Percy P. Lantzy
ATTORNEY

INVENTOR
CHARLES L. ESTES
BY Percy P. Lantzy
ATTORNEY

INVENTOR
CHARLES L. ESTES
BY Percy P. Lantzy
ATTORNEY

United States Patent Office 2,815,486

Patented Dec. 3, 1957

2,815,486

ELECTRICAL SIGNAL TRANSLATING SYSTEM

Charles L. Estes, Scottsdale, Ariz., assignor to International Telephone and Telegraph Corporation, a corporation of Maryland Application May 22, 1952, Serial No. 289,275

11 Claims. (Cl. 332—1)

This invention relates to an electrical signal translator and more particularly to a translating system for converting a cyclic progression code of any base and any number of digits to a pulse code modulation of corresponding base and number of digits, such as binary, ternary, tetrad, or quinary code, for decoding.

Heretofore, coded transmission has employed PCM code which is advantageous for decoding since each pulse has a definite weight. However, PCM code has a serious disadvantage from the standpoint of the encoding operation. If the input signal should fall between two distinct signal levels, a spurious output may result which would produce a code signal in error by several signal levels. In order to prevent such errors, the signal must be accurately quantized so that it falls near the center of the step or element representing the desired code. This error may be prevented by employing a coding tube which accomplishes the desired result with the quantizing grid and associated circuitry of considerable complexity. Following the spirit of the invention herein described, the so-called cyclic progression or CP code obviates this difficulty by allowing only one pulse to change between code signal levels. Therefore, it is an object of this invention to provide an electrical signal translator which is capable of being activated by a coded signal allowing only one pulse change between code signal levels when encoding.

A CP code for binary PCM was proposed by Pierre R. Aigrain in copending application, Serial No. 3,230, filed January 20, 1948, now Patent No. 2,660,618 entitled "Signal Translating System." The proposed binary code and system therein described may be employed successfully in radio frequency systems since bandwidth is not at a premium and the simplicity of on-off pulses makes for simple equipment. However, where PCM must be transmitted over coaxial cable, the situation is different. Here bandwidth is all important since the attenuation increases rapidly with frequency. To overcome this undesirous condition, a ternary code, a code of base three has been employed which for a comparable number of signal levels requires only 63 percent of the bandwidth required by the binary code. Therefore, it is another object of this invention to provide an electrical signal translator which will translate a ternary CP code to a ternary PCM code for decoding purposes.

It has been further determined that the above-mentioned ternary code can be expanded to codes of any number of digits and any base. Therefore, a further object of this invention is to provide one basic electrical signal translator which will suffice for codes of any number of digits and any base.

A feature of this invention is to provide a zero level pulse detector employed in a ternary CP electrical signal translator.

Another feature of this invention is to provide an even level pulse detector employed in electrical signal translators for converting a higher base CP code to PCM code of a corresponding base.

A further feature of this invention is to provide for the addition of circuitry to a three digit electrical signal translator for accommodation of a CP code having four or more digits included therein.

The above-mentioned and other features and objects of this invention will become more apparent by reference to the following description taken in conjunction with the accompanying drawings, in which:

Figs. 1, 1*a*, and 1*b* illustrate the CP code and the corresponding PCM code for a three digit-base three translator system in accordance with the principles of this invention, PCM code sequence at signal level minus two, and CP code sequence at signal level minus two, respectively;

Figure 4:
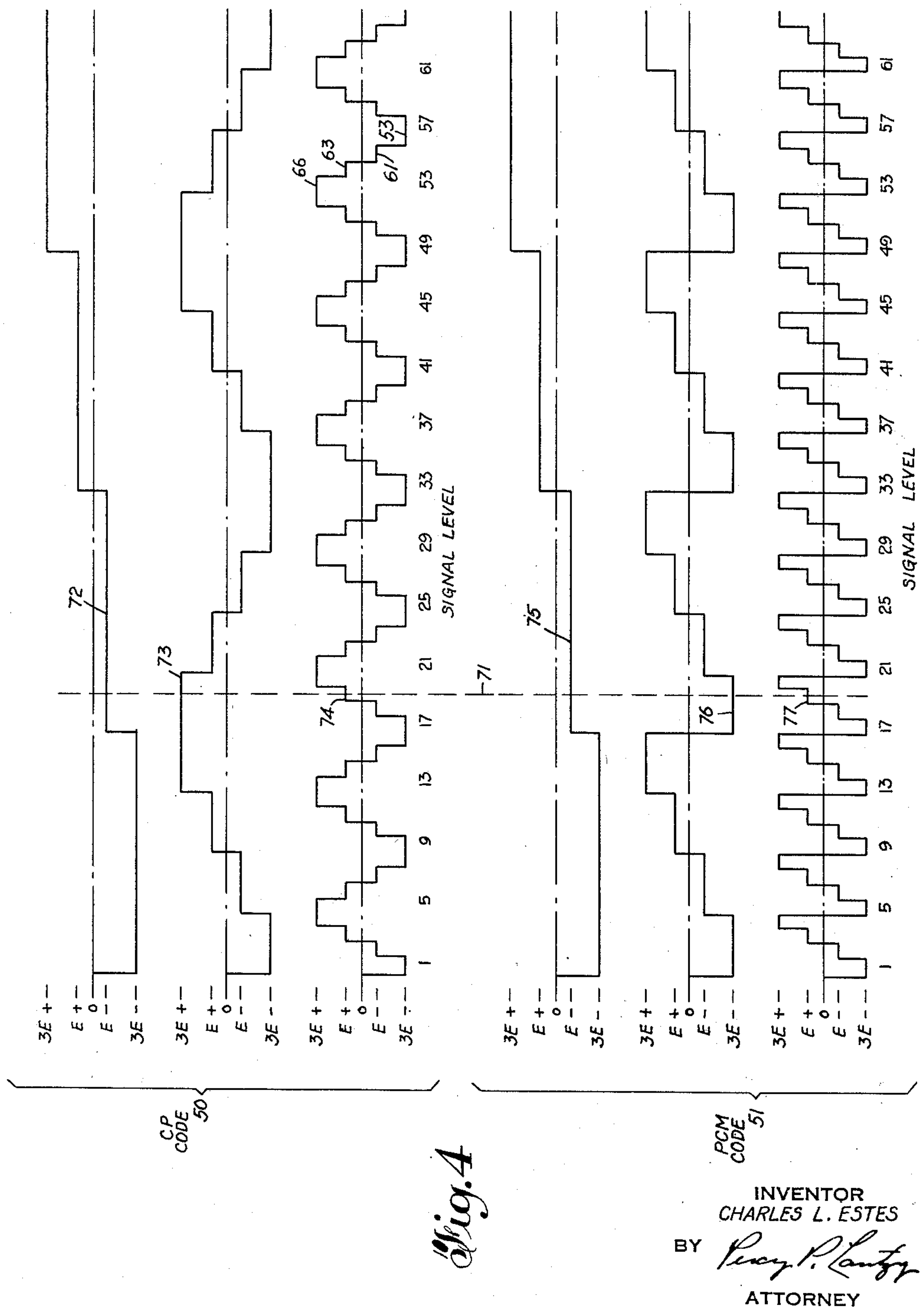
Figure 5A:
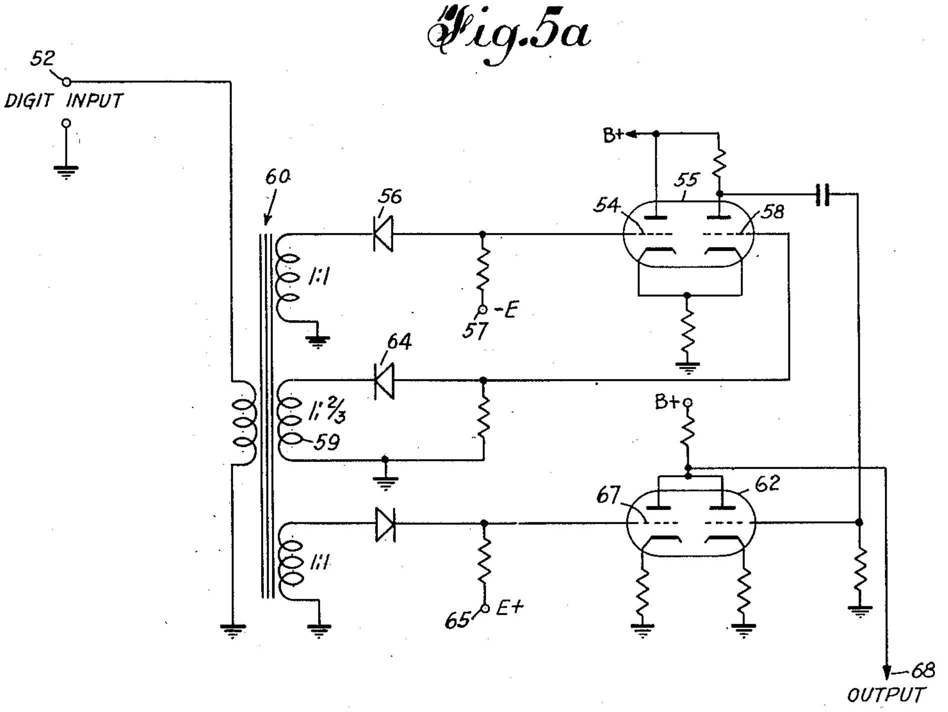
Figure 5B:
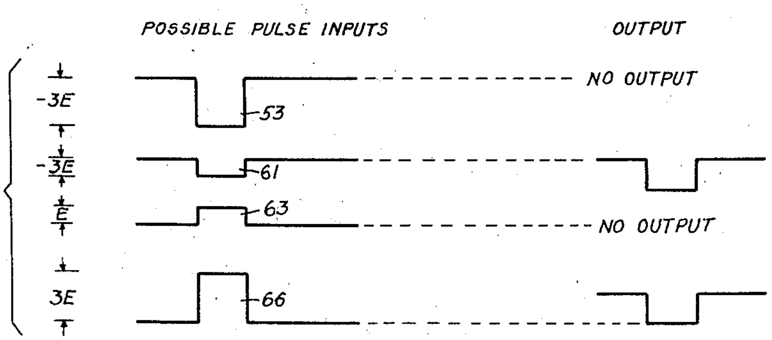
Figure 6:
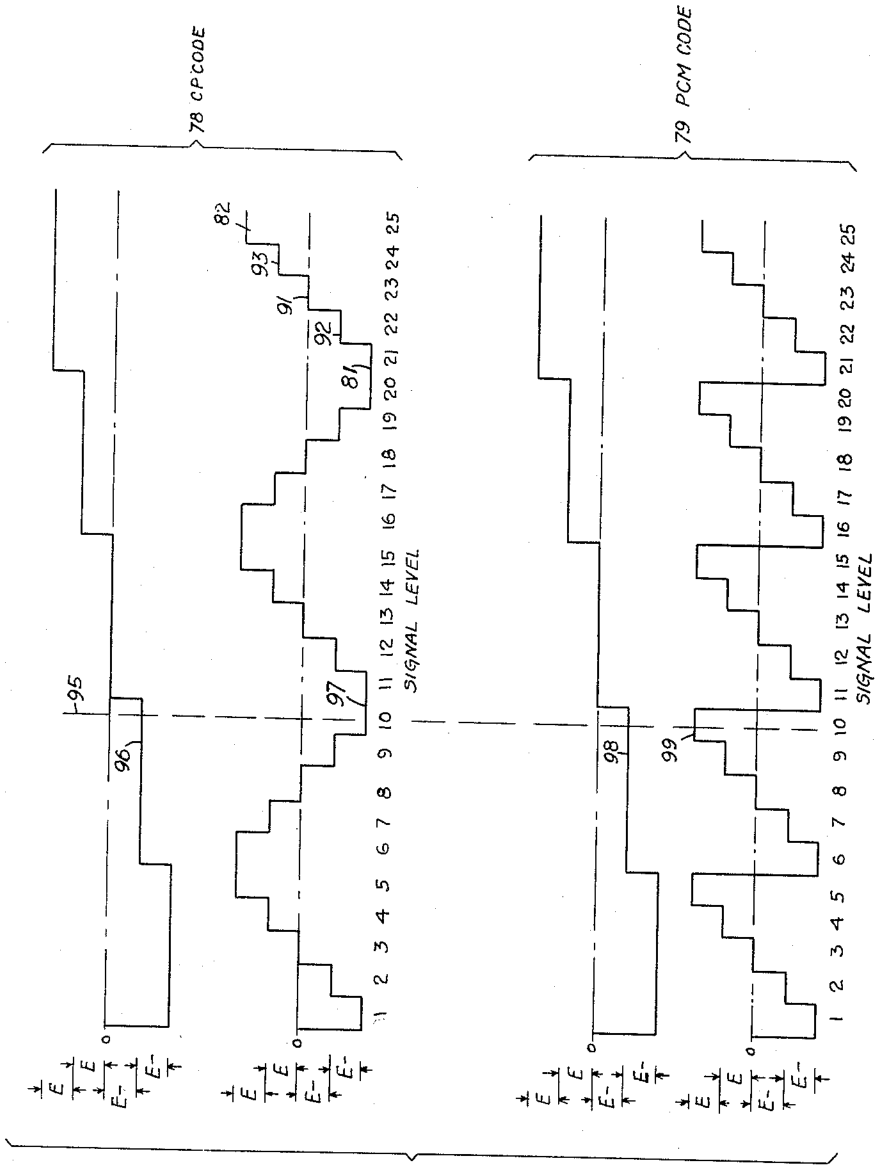
Figure 7A:
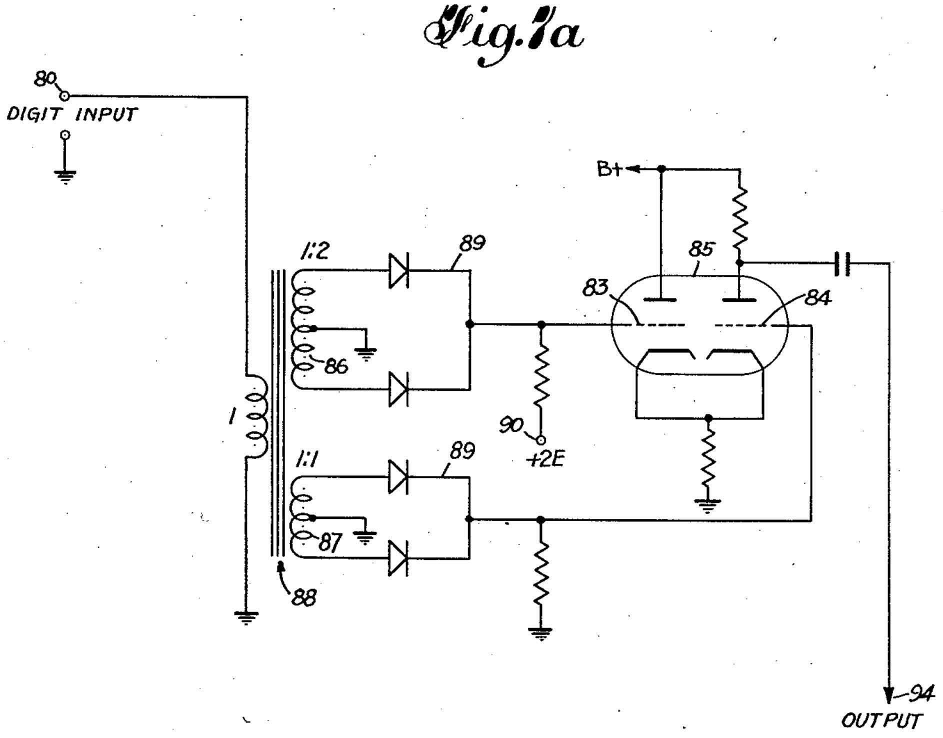
Figure 7B:
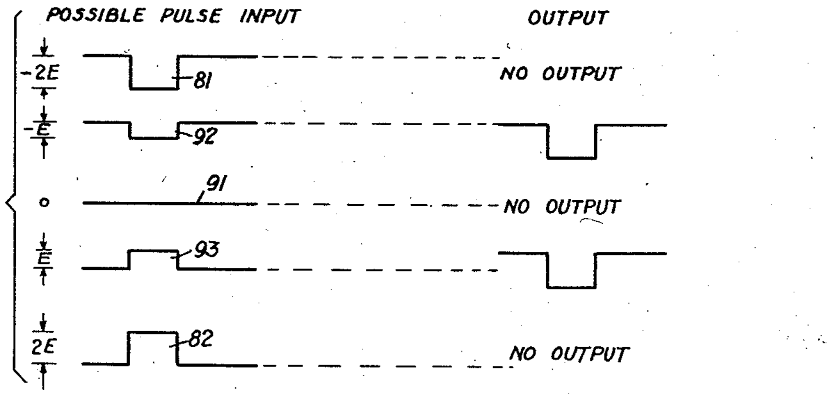

Figs. 4, 5*a*, and 5*b* illustrate the CP code and the corresponding PCM code employed in a three digit-base four translator system, the schematic diagram of an even level pulse detector employed in a base four translator system, and the possible pulse inputs and outputs of such an even level pulse detector, respectively; and Figs. 6, 7*a*, and 7*b* illustrate the CP code and the corresponding PCM code employed in a two digit-base five translator system, the schematic diagram of an even level pulse detector employed therein, and the pulse inputs and outputs of such an even level pulse detector, respectively.

Figure 1:
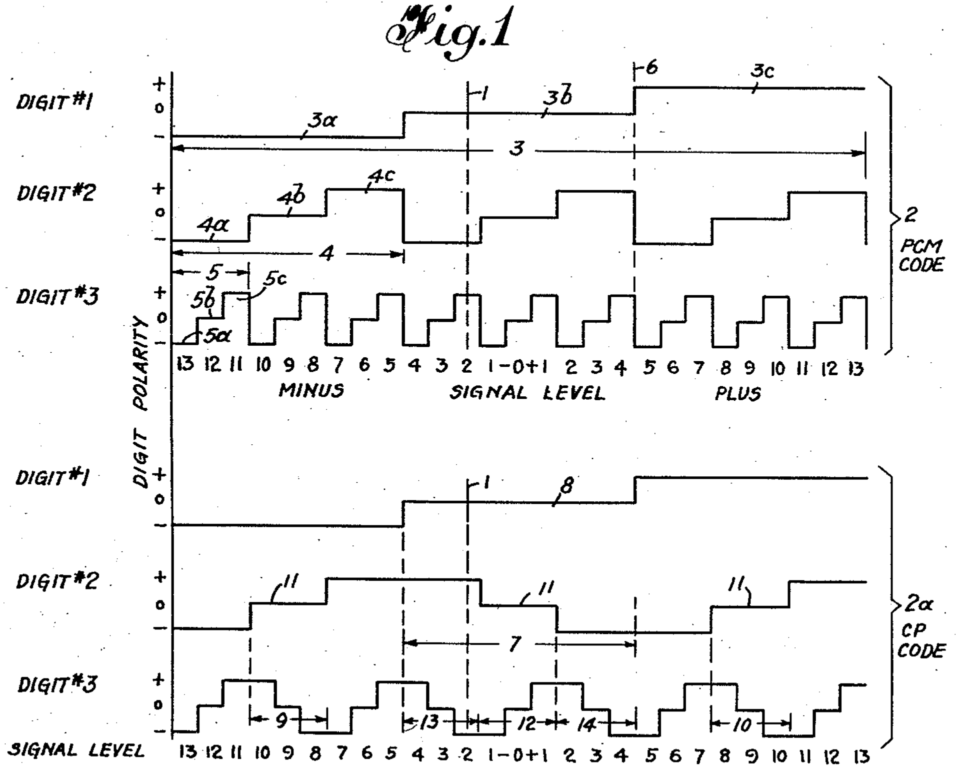

With reference to Fig. 1, a general mathematical definition or expression for the CP code may be developed which will be of assistance in understanding the embodiments of my invention. Consider an *n*-digit number written in standard mathematical form, such as that employed for PCM code which may be expressed as: $a_1, a_2, a_3, \ldots a_n$ where $a=0, 1, 2, \ldots i$. Therefore, it may be said that the digit $a$ may have any value 0 through $i$ where $i$ is equal to one less than the radix of the number system employed, for instance, $i=1$ for a binary system, $i=2$ for a ternary system, $i=9$ for a decimal system. The $n$th digit of this mathematical series is the least weight digit for the code sequence. Going from the PCM code mathematical form to that of the CP code, it is found that the CP code may be expressed in the form $P_1, P_2, P_3, \ldots P_n$ where the $k$th CP digit is found from the general equation $$(1)\qquad P_k=\left(a_k-\frac{i}{2}\right)(-1)^{\sum_{r=0}^{k-1} P_r}+\frac{i}{2}$$

In Equation 1, the CP number is assumed to be preceded by a digit $P_0$ having the value 0. Furthermore, it may be stated that if the summation $$\sum_{r=0}^{k-1} P_r$$

contains an even number of odd-value digits, the sum is even and $P_k=a_k$. From this it will be noted that the relation $P_1=a_1$ always holds. However, if the summation $$\sum_{r=0}^{k-1} P_r$$

contains an odd number of odd-valued digits, the sum is odd and $P_k=i-a_k$. For application of these rules zero is considered to be even.

An example solution of Equation 1 may be effected by considering the ternary number 102 where $i=2$ and Equation 1 becomes:

$$(2)\qquad P_k=(a_k-1)(-1)^{\sum_{r=0}^{k-1}}+1$$

For the ternary number 102, we have $a_1=1$, $a_2=0$, $a_3=2$. Hence, $$P_1=(a_1-1)(-1)^{\sum_{r=0}^{0}P_r}+1=(1-1)(-1)^{P_0}+1=1$$

$$P_2=(a_2-1)(-1)^{\sum_{r=0}^{1}P_r}+1=(0-1)(-1)^{P_0+P_1}+1=2$$

$$P_3=(a_3-1)(-1)^{\sum_{r=0}^{2}}+1=(2-1)(-1)^{P_0+P_1+P_2}+1=0$$

The CP code equivalent is therefore 120.

Considering the ternary number 102 and the CP equivalent 120 from an energy viewpoint, the average values of these codes PCM and CP, respectively, would be changed by subtracting one from each digit when employed in electronic equipment to give the code forms: PCM 0, −1, +1, and CP 0, +1, −1,. These codes are indicated in Fig. 1 by the vertical broken line 1, read from top to bottom, in the PCM code group 2 and the CP code group 2*a*.

Figures 1A, 1B, 2:
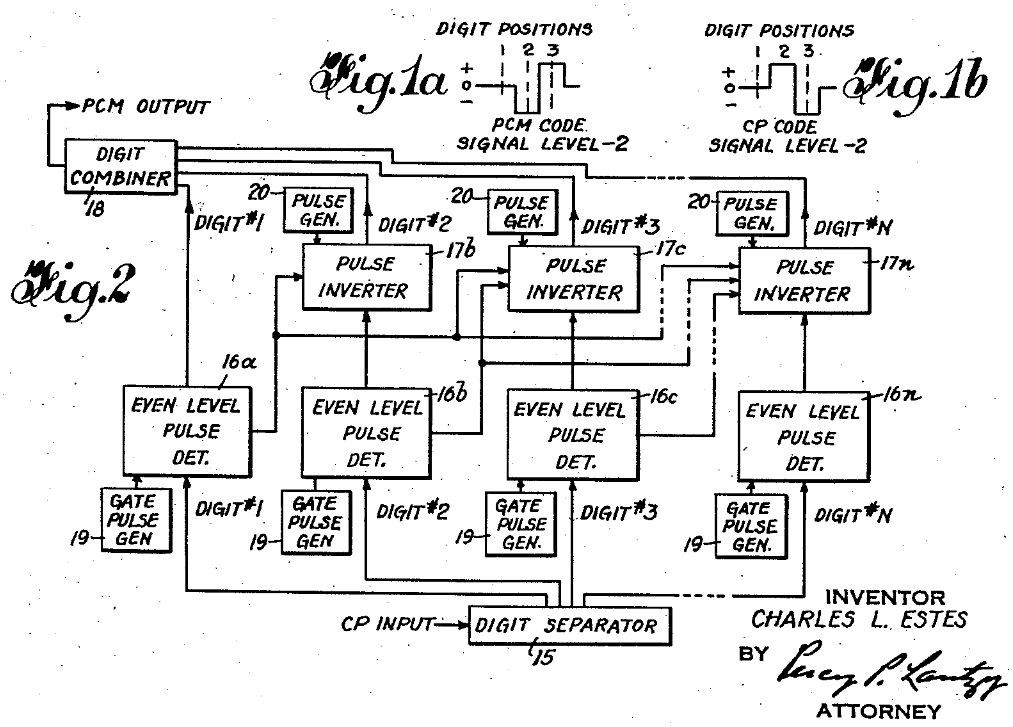
Fig. 2 shows a block diagram of a generalized CP code to PCM code translator according to this invention.

Referring further to Fig. 1, in PCM code group 2 there is shown a three digit-base three system which may be shown to be derived from the aforementioned equation and from the more general relation that a PCM code and a CP code may have *n* number of digits with any base *b* producing a code that represents $b^n$ signal levels. The PCM code group 2 may be constructed from these general relations as follows: Digit #1 may be represented having a flight 3 of *b* steps 3*a*, 3*b*, and 3*c* ascending to the right. In a video system the steps of flight 3 might be represented by corresponding amplitudes of the digit, while in a system involving a radio-frequency link, the steps might be represented by different values of frequencies. Digit #2 may be constructed directly below digit #1 in such a manner that one flight 4 of *b* steps 4*a*, 4*b*, and 4*c* fall under each step 3*a*, 3*b*, and 3*c* of digit #1, and it follows that digit #3 will have one flight 5 of *b* steps 5*a*, 5*b*, and 5*c* under each step of digit #2. This process may be repeated until all *n* digits are represented in a similar manner. Thus an example of a ternary PCM code having a base three is illustrated in Fig. 1 where $n=3$, $b=3$ and such a code represents $3^3$ or 27 signal levels. As therein indicated, the steps or elements of each flight 3, 4, and 5 have been assigned negative, zero, and positive values. The code for a given signal level is obtained by reading vertically downward, as heretofore mentioned. For instance, the three digit code for signal level −2, see vertical broken line 1, is indicated for that level as comprising zero or no pulse for digit position #1, a negative pulse for digit position #2, and a positive pulse for digit position #3, such as for example 0−1+1 as shown in Fig. 1*a*.

As hereinbefore stated, the PCM code is convenient for decoding since each pulse has a definite weight, for instance, in Fig. 1, PCM code group 2 digit #1 has a weight of 9, digit #2 has a weight of 3, and digit #3 has a weight of 1. These weights may be generally derived from the ratio of the number of signal levels to the number of elements in flights 3, 4, or 5 included in the digit under consideration. However, from the standpoint of the encoding operation, the PCM code has a serious disadvantage, since a spurious output may result if the signal being coded falls between two signal levels. For instance, if the signal falls between signal levels +4 and +5, as at line 6, then digit #1 might register 0, and the next two digits minus. The resulting code signal, 0—1—1, is the code signal for signal level —4 and an error of eight signal levels is produced. To prevent these errors, the signal to be coded must be accurately quantized so that it always falls substantially at the center of the elements 5*a*, 5*b*, and 5*c*, as the case may be.

To overcome this encoding problem and to eliminate the necessity of quantizing circuits, the cyclic progression or CP code for a PCM system has been developed. In the aforecited copending application a CP code for binary PCM was proposed which substantially eliminated the encoding problem in PCM code. However, the use of such a binary PCM system over coaxial cable is not desirable since the bandwidth is all important due to the fact that the attenuation in such a cable increases rapidly with frequency. Therefore, the present invention relates to the ternary and higher coding system incorporating the necessary circuitry to perform the conversion from CP code to PCM code for decoding. Such coding systems provide a saving of bandwidth, for a ternary system approximately a 37 percent saving of bandwidth, and may be employed in any of several types of PCM transmission systems, not necessarily confined to coaxial transmission.

Referring particularly to CP code group 2*a* of Fig. 1, it will be found that that code may be obtained from the PCM code group 2 by maintaining flight 3 and inverting alternate ones of the flights 4 and 5. As herebefore stated, employing a ternary or higher order code, it is unnecessary to quantize the signal to be coded thus simplifying encoding. To decode this type of CP code, it is necessary in this instance to translate the CP code into a PCM code. Comparison of the two codes will reveal that if all steps or elements under the zero step level of a preceding digit, Fig. 1, are inverted, the PCM code is obtained. For instance, segment 7 located in digit #2 is under the zero step level 8 of digit #1, therefore it is inverted. Segments 9 and 10 of digit #3 are under the zero level steps 11 of digit #2, therefore they are inverted for the same reason. Segment 12 of digit #3 is under two zero level steps 8 and 11, therefore segment 12 is inverted twice restoring it to its original condition. Segments 13 and 14 are inverted since they are situated under zero level step 8 of digit #1. Therefore, the inversions herein described transform the CP code into the PCM code. A comparison of the combined code before and after at signal level minus two may be made by referring to Figs. 1*a* and 1*b*.

The circuit to perform the transformation of CP code to PCM code is shown in the generalized block diagram of Fig. 2. It is assumed here as in the subsequent embodiments that the CP code has been produced from any one of a number of coding systems that may be adapted for this purpose. The CP to PCM translator herein illustrated gives the general circuitry in block form which may be utilized to transform CP code to PCM code for any code system containing *n* number of digits and *b* number of elements or desired combinations thereof. A CP code group substantially the same as shown in Fig. 1, code group 2*a* is applied to a conventional digit separator circuit 15 of the translator such that the corresponding digit is correctly presented to its even level pulse detector 16*a*, 16*b*, 16*c*, or 16*n* which provides an output therefrom to properly activate the pulse inverters 17*b*, 17*c*, or 17*n* to produce the equivalent PCM digits. The individual outputs of inverters 17*b*, 17*c*, and 17*n* are presented to digit combinor 18 to provide a PCM code wherein the PCM digits are presented for decoding in the proper sequence. Incorporated herein is a pulse generator 19 to assure operation of each of the detectors, if the digit pulse applied thereto is proper for conduction, as hereinbelow described. Reset pulse generator 20 assures that the pulse inverter is reset for operation of the succeeding pulse. These pulse generators may be separate generators as illustrated herein or the gate pulse sources may be from a common source properly synchronized to perform the desired functions.

Figure 3:
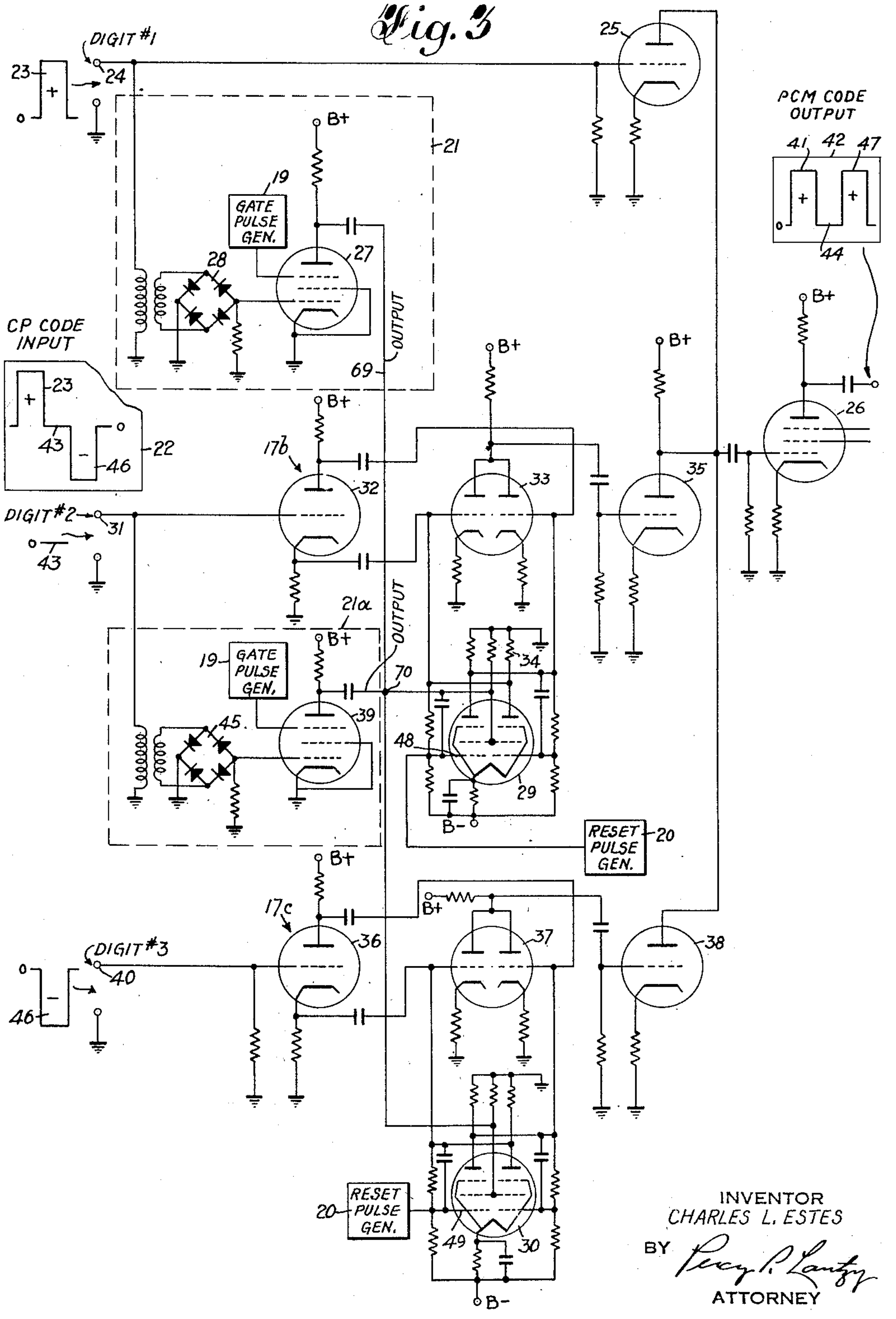
Fig. 3 shows the schematic diagram of the circuits of Fig. 2 having a three digit-base three translator.

A schematic diagram of a CP code to PCM code translator is shown in Fig. 3 for ternary CP code having a base of three. In the case of such a CP code, there is only one even level pulse and this is a pulse of zero amplitude, therefore, the even level pulse detector (16*a*, 16b, 16c, 16n, Fig. 2), in the general block diagram will now be termed a zero pulse level detector (21 or 21a) for discussion of the ternary-base three digit system.

In Fig. 3 is shown the composite waveform of the input CP code 22 for signal level +10 of Fig. 1, +1, 0, −1, which will be employed in the explanation of the operation of this translator circuit. The digit #1, positive element 23, is fed into terminal 24 from separator 15, Fig. 2. Since element 23 is the same in both the CP and PCM code, it is fed directly to the electron discharge device 25, digit #1 combinor, and from there to the output electron discharge device 26, the element 23 appearing negative on the plate of the device 25 and positive on the plate of the device 26. While the element 23 is in the process of going to the output device 26, it is also being examined by electron discharge device 27, the digit #1 pulse detector 21. If element 23 is either positive or negative, the full-wave rectifier 28 will produce a strong negative pulse on the grid of the device 27, biasing device 27 well below cut-off, and no output will result when a positive gate pulse is applied from pulse generator 19 to the suppressor grid of the device 27. Thus multivibrators 29 and 30, respectively, are left inoperative or unchanged. However, if element 23 is zero, the grid of device 27 is not biased below cut-off, and a pulse will result in the plate circuit which will operate the inverting circuits, explained herebelow, in both the digit #2 and #3 positions. Hence it can be seen that with the code example herein employed, the inverting circuit will be left in an unchanged position.

Considering the operation of the inverting circuits from a general viewpoint, the digit #2 code elements are fed through terminal 31 to the grid of the electron discharge device 32 where an element appears on the cathode in the same polarity and on the plate in reverse polarity. The electron discharge device 33 is a gate device operated by the multivibrator 29. When the multivibrator is in its normal condition, section B is conducting and the voltage drop across the plate resistor 34 is sufficient to cut-off section A of the device 33 and the pulse on the plate of the device 32 is passed through section B. If the digit #1 code element should be such as to cause the device 27 to produce an output pulse, the screen of the multivibrator 29 is pulsed and transferred to its other stable condition. In this condition the pulse on the cathode of the device 32 is passed through devices 33 and 35, producing an output pulse at the plate of the output device 26 which is inverted in polarity as compared with the pulse at terminal 31, by the output from the device 27, a portion of the digit #1 pulse detector 21. The inverting circuit of the digit #3, composed of electron discharge devices 36, 37, 38, and multivibrator 30 is operated in substantially the same manner.

The digit #2 circuit also has a zero level pulse detector 39 which activates the inversion of elements in digit #3 applied at terminal 40 by reversing the stable condition of multivibrator 30. This also operates the multivibrator 29, but this is not detrimental since this only happens when the digit #2 element is of zero amplitude.

Returning to the composite waveform of CP code 22 for signal level +10, it will be remembered that the positive element 23 was passed through the output device 26 to produce positive element 41 in the PCM code output 42 shown in Fig. 3. Digit #2 element 43 is introduced to the circuit at terminal 31 after passing through separator 15 and has a zero amplitude, therefore, ouput device 26 puts out no pulse, such as indicated at 44 in the PCM code output 42. However, since full-wave rectifier 45 receives no pulse, the digit #2 zero level pulse detector 21a produces a pulse when the suppressor grid of device 39 is keyed by its associated positive pulse generator 19. This output from the plate of the device 39 reverses the multivibrators 29 and 30 from one stable condition to the other. Digit #3 element 46 is negative but due to the reversal of the multivibrator 30, the element 46 appears as a positive pulse in the output device 26, as shown in the PCM code output 42 at 47. Thus, the CP code +1, 0, −1 has been translated into the proper PCM code +1, 0, +1. To restore the circuit herein described to its original condition for the next signal level code to be translated, a negative pulse is applied to points 48 and 49 of the multivibrators 29 and 30, respectively, from their associated pulse generators 20.

It generally may be stated that to operate a CP code to PCM code translator for any number of digits $n$ and any number of elements $b$, it is first necessary to detect the presence of even level pulses or elements. When such an even level pulse or element occurs, the subsequent digit elements are inverted. As in the case of the CP ternary-base three digit code, there is only one even level element, as herein described. This even level element is an element of zero amplitude. Therefore, it is necessary to employ a zero level pulse detector 21 or 21a, as shown in the dotted lines of Fig. 3. In order to expand the circuit for operation with systems or codes of higher base, it is only necessary to replace the zero level pulse detector 21 with an even level pulse detector of proper design. Possible circuits for base four and base five systems are shown in Figs. 5 and 7, respectively. It follows from what has been said herein that the employment of these expanded ternary codes will further reduce the required bandwidth. However, it will be necessary, for those skilled in the art, to determine the point of diminishing return for their particular problem by considering both the reduced bandwidth required and the equipment complexity which is necessary to achieve this desired bandwidth.

The CP code group 50 and PCM code group 51 for a three digit-base four system are illustrated in Fig. 4. To translate a CP code to PCM code, it is necessary to employ the circuit of Fig. 5a in place of the zero level pulse detector 21 of Fig 3, the other circuitry remaining substantially the same. The number of signal levels present in Fig. 4 is 64, as compared with 27 for a three digit-base three system. This code is such that the pulse or element amplitudes of three digits are −3E, −E, +E, and +3E. The even level pulses are therefore of amplitude −E and +3E and the even level pulse detector of Fig. 5a produces a pulse whenever either of these amplitudes are present which in turn operate the multivibrators 29 and 30 of Fig. 3 as described in connection with the three digit-base three system. Operation of the circuit shown in Fig. 5a may be developed by considering the four possible pulse or element input cases as illustrated in Fig. 5b and in the CP code group 50 of Fig. 4 by the corresponding reference characters. A digit input containing all or some of these pulses, depending upon coded signal, shown in Fig. 5b would normally be applied to terminal 52 separately from separator 15.

(1) An element 53 of amplitude −3E volts will produce a pulse of −2E volts on the left-hand grid 54 of the electron discharge device 55 by virtue of the biased rectifier 56, shown schematically to be a crystal rectifier in this instance. The bias voltage in this particular segment of the circuit is −E volts and is applied at terminal 57, but it is conceivable that this bias voltage could be any desired amount depending upon requirements of the circuit. A pulse of −2E volts will also appear at the right-hand grid 58 since winding 59 of transformer 60, which supplies the pulse, has a turns ratio of 1:2/3. Therefore, no output will result since device 55 is a differential amplifier and responds only when there is a difference of amplitude between the two pulses applied to grids 54 and 58.

(2) An element 61 of amplitude −E volts will produce no signal at grid 54 of device 55 due to the bias voltage applied at terminal 57. However, a signal of −2/3E volts will result at grid 58 of device 55. Therefore, device 55 will have an output which will pass through electron discharge device 62 and be available for operating the multivibrators 29 and 30 of Fig. 3.

(3) An element 63 of amplitude +E volts will pass none of the indicated rectifiers, rectifiers 56 and 64 being opposite in polarity to element 63, and the bias voltage of +E volts at terminal 65 will cancel the input element 63, and therefore no output results.

(4) An element 66 of amplitude +3E volts will deliver a +2E volt pulse to the left-hand grid 67 of device 62 and output will result which will effect the proper element inversion, substantially in the same manner as described in connection with the three digit-base three system of Fig. 3. Device 55 will not be affected by element 66 due to the polarity of rectifiers 56 and 64. The pulses produced at the output 68 of the even level pulse detector corresponds to and performs substantially the same functions as the pulses at the outputs 69 and 70 of the high level pulse detectors 21 of Fig. 3.

Following the aforementioned teachings, in connection with Figs. 5 and 3, the inversions and resulting code which will take place may be seen by referring to signal level 19 of Fig. 4, indicated by vertical line 71. The CP code for level 19 is −E, +3E, +E. Since digit #1 has an even level element 72, digit #2 is inverted to −3E. However, digit #2, +3E, is also an even level element 73, therefore, digit #3, +E, as shown at 74, is inverted twice resulting in an element of +E. The resulting PCM code for signal level 19 is then−E, −3E, +E, as indicated at 75, 76, and 77 on the vertical line 71.

Referring to Figs. 6, 7*a*, and 7*b*, another embodiment of my invention is indicated which employs a two digit-base five code and the accompanying even level pulse detector to accomplish the desired translation from the CP code group 78 to an equivalent PCM code group 79. Elements of amplitudes −2E, −E, 0, +E, and +2E are present in such a code system. The even level elements therein are −E and +E which produce an output trigger pulse from even level pulse detector of Fig. 7*a*. There are five situations or cases to be considered for understanding the operation of the circuit of Fig. 7*a* which are illustrated in Fig. 7*b* and CP code group 78 of Fig. 6 by corresponding reference characters. Any or all of the possible elements or digits shown in Fig. 7*b* may be applied at terminal 80 separately from separator 15.

(1) Elements 81 and 82 of amplitude −2E volts and +2E volts, respectively, produce pulses of +2E volts at grids 83 and 84 of the electron discharge device 85 by virtue of the 1:2 turns ratio of winding 86 and the 1:1 turns ratio of winding 87 of transformer 88, the full-wave rectifiers 89 and the bias voltage of +2E volts applied at terminal 90. Accordingly, since device 85 is a differential amplifier, there is no resultant output.

(2) As can be readily understood by those skilled in the art, element 91 of zero amplitude produces no output.

(3) Elements 92 and 93 of amplitude −E volts and +E volts, respectively, produce no signal at the left-hand grid 83 of device 85 because of the bias voltage applied at terminal 90, but they do produce a +E volt pulse at the right-hand grid 84 of device 85. An output pulse is then available at output terminal 94 corresponding to the output terminal 69 of the zero level pulse detector 21 of Fig. 3, for triggering the multivibrator 29 inverter circuit. In such a two-digit system it is necessary only to employ one inverter circuit rather than the two inverters shown in Fig. 3.

An example of the translated pulse may be obtained by reference to the vertical line 95 of Fig. 6 which corresponds to a CP code for signal level 10 and the equivalent PCM code obtained. The CP code is −E, −2E. Digit #1 is an even level element 96, and therefore inverts digit #2 element 97 of amplitude −2E which becomes an element of amplitude +2E volts. The resulting code −E, +2E is the PCM code for signal level 10, as illustrated at 98 and 99 on vertical line 95.

The examples herein described consisted of a code translation at one signal level, however, it is readily seen that with substantial rapidity the signal levels are consecutively translated from CP code to PCM code, consistent with the signal being encoded as a CP code system giving a reliable means of transmitting any desired signal by PCM multiplex methods.

In order to extend the translator illustrated in Fig. 3 to base six, and higher base systems, it is necessary to design rather simple even level pulse detectors substantially the same as those indicated in Figs. 5 and 7, circuit changes made therein depending upon the number of bases in the code system employed which it must translate. To extend the translator for operation with greater number of digits, it is necessary to duplicate the circuitry composed of devices 32, 33, 29, and 35 in Fig. 3 the required number of times.

The basic ternary translator circuit is finding application in high-speed ternary PCM system for use in transmitting television. However, the application of this system and its many modifications is not limited to this particular application. This system herein described will find application wherever bandwidth is limited and high-speed plus efficiency of reproduction is desired.

While I have described above the principles of my invention in connection with specific apparatus, it is to be clearly understood that this description is made only by way of example and not as a limitation to the scope of my invention as set forth in the objects thereof and in the accompanying claims.

I claim:

1. A system for converting the code signals of a multiple digit, plural element cyclic progression code into code signals of pulse code modulation having corresponding multiple digit and plural elements, comprising a plurality of translators corresponding to the successive digits of said cyclic progression code, normally inoperative signal inverter means in each translator except the first for inverting the proper segments of applied signals, means in each translator except the last for detecting in response to the applied signal those elements corresponding to a given signal level, and means responsive to detection of elements of said given level for rendering the inverter of the next successive translator operative.

2. A system for converting according to claim 1, wherein said means responsive to said detection of elements comprises an electron discharge device having a plurality of electrodes, a gate pulse source, and means coupling said gate pulse source to one of said plurality of electrodes, said means for detecting elements of given level having means to apply a cut-off bias to another of said plurality of electrodes to render said electron discharge device inoperative for all elements other than those of said given level.

3. A system for converting according to claim 1, wherein said normally inoperative signal inverter means comprises an electron discharge digit input device, an electron discharge gate, means coupling the output of said digit input device to said gate, an electron discharge multivibrator, means coupling the output of said element detection means to said multivibrator, and means coupling said multivibrator to said gate for controlling the conduction thereof, said multivibrator being shifted from a first stable condition to a second stable condition by an output of said element detection means, said gate being thereby controlled to invert the element applied to said input device by the second condition of said multivibrator.

4. A system for converting according to claim 1, wherein said means for detecting elements corresponding to said given level comprises an electron discharge device having a plurality of control electrodes, a magnetic coupling associated with the applied signal, rectifying means coupling said magnetic coupling to one of said control electrodes, and a gate pulse souce coupled to another of said control electrodes to coincidently key said discharge device for the recognition of elements of said given level and rejection of other of said elements.

5. A system for converting according to claim 4, wherein said magnetic coupling comprises a single secondary winding connected to said rectifying means including four rectifiers connected in a bridge-like arrangement to bias said one of said control electrodes in a manner to cooperate with said gate pulse source for recognition of elements of said given level.

6. A system for converting according to claim 1, wherein said means for detecting elements corresponding to said given level comprises at least one electron discharge device having a plurality of electrodes, a magnetic coupling having a predetermined turns ratio associated with the applied signal, rectifying means coupling said magnetic coupling to certain of said electrodes, and biasing means coupled to given ones of said electrodes for the recognition of elements of said given level and rejection of other of said elements.

7. A system for converting according to claim 6, wherein said magnetic coupling comprises multiple secondary windings of different turns ratio and said rectifying means includes a rectifier device associated with each of said secondary windings to activate said means responsive.

8. A system for converting according to claim 6, wherein said magnetic coupling comprises three secondary windings having predetermined turns ratios and said electron discharge device comprises first and second double triode type devices each having first and second control electrodes, the first and third secondary windings having a turns ratio of 1:1, a rectifier coupling each of said windings to the first control electrode of both the first and second of said devices, said rectifiers being connected in the opposite polarity sense, a rectifier having the same polarity sense as the rectifier coupled to the first winding coupling the second control electrode of said first device to the second of said windings having a turns ratio of 1:2/3, means biasing said first control electrodes of each of said devices equally but opposite in polarity, and means coupling the anode of said first device directly to the second control electrode of said second device, the combination thereof functioning in a coincident manner to respond to those elements corresponding to a given signal level.

9. A system for converting according to claim 6, wherein said magnetic coupling comprises two secondary windings having predetermined turns ratio and said electron discharge device comprises a double triode type device having first and second control electrodes, the first of said windings having a turns ratio of 1:2, means returning the center tap of said first winding to ground potential, a first pair of rectifiers having the same polarity sense coupling each end of said first winding to said first control electrode, the second of said windings having a turns ratio of 1:1, means returning the center tap of said second winding to ground potential, a second pair of rectifiers having the same polarity sense as said first pair of rectifiers coupling each end of said second winding to said second control electrode, means biasing said first control electrode at a given reference voltage, and resistance means returning said second control electrode to ground potential, the combination thereof functioning in a coincident manner to respond to those elements corresponding to a given signal level.

10. In a system of the character described, a pulse detector for detecting pulse elements corresponding to a given signal level comprising at least one electron discharge device having a plurality of electrodes, rectifying means coupled to certain of said electrodes, a magnetic coupling device for presenting the pulse elements to said rectifying means, and biasing means coupled to given ones of said electrodes causing said electron discharge device to be normally non-conductive for cooperating in the recognition of elements of said given level and rejection of other of said elements, said magnetic coupling device including multiple secondary windings each having different turns ratios and said rectifier means including a rectifier device coupled to each of said windings cooperating to overcome the bias of said biasing means and causing conduction of said discharge device upon occurrence of elements of said given level, said magnetic coupling comprising three secondary windings having predetermined turns ratios and said electron discharge device comprising first and second double triode type devices each having first and second control electrodes, the first and third secondary windings having a turns ratio of 1:1, a rectifier coupling each of said windings to the first control electrode of both the first and second of said devices, said rectifiers being connected in the opposite polarity sense, a rectifier having the same polarity sense as the rectifier coupled to the first winding coupling the second control electrode of said first device to the second of said windings having a turns ratio of 1:2/3, means biasing said first control electrodes of each of said devices equally but opposite in polarity, and means coupling the anode of said first device to the second control electrode of said second device, the combination thereof functioning in a coincident manner to respond to those elements corresponding to a given signal level.

11. In a system of the character described, a pulse detector for detecting pulse elements corresponding to a given signal level comprising at least one electron discharge device having a plurality of electrodes, rectifying means coupled to certain of said electrodes, a magnetic coupling device for presenting the pulse elements to said rectifying means, and biasing means coupled to given ones of said electrodes causing said electron discharge device to be normally non-conductive for cooperating in the recognition of elements of said given level and rejection of other of said elements, said magnetic coupling device including multiple secondary windings each having different turns ratios and said rectifier means including a rectifier device coupled to each of said windings cooperating to overcome the bias of said biasing means and causing conduction of said discharge device upon occurrence of elements of said given level, said magnetic coupling comprising two secondary windings having predetermined turns ratio and said electron discharge device having first and second control electrodes, comprising a double triode type device, the first of said windings having a turns ratio of 1:2, means coupling the center tap of said first winding to ground potential, a first pair of rectifiers having the same polarity sense coupling each end of said first winding to said first control electrode, the second of said windings having a turns ratio of 1:1, means coupling the center tap of said second winding to ground potential, a second pair of rectifiers having the same polarity sense as said first pair of rectifiers coupling each end of said second winding to said second control electrode, means biasing said first control electrode at a given reference voltage, and resistive means coupling said second control electrode to ground potential, the combination thereof functioning in a coincident manner to respond to those elements corresponding to a given signal level.

References Cited in the file of this patent

UNITED STATES PATENTS

| | | |
|---|---|---|
| 2,199,634 | Koch | May 7, 1940 |
| 2,263,633 | Koch | Nov. 25, 1941 |
| 2,371,397 | Koch | Mar. 13, 1945 |
| 2,404,307 | Whittaker | July 16, 1946 |
| 2,484,352 | Miller et al. | Oct. 11, 1949 |
| 2,538,615 | Carbrey | Jan. 16, 1951 |
| 2,571,680 | Carbrey | Oct. 16, 1951 |
| 2,601,354 | Wylie | June 24, 1952 |
| 2,693,525 | Kendall et al. | Nov. 2, 1954 |

FOREIGN PATENTS

| | | |
|---|---|---|
| 129,903 | Australia | **Nov. 9, 1948** |